United States Patent Office 2,726,141
Patented Dec. 6, 1955

2,726,141

PROCESS FOR REMOVING IMPURITIES FROM PRECIOUS METAL COMPOUNDS IN SOLUTION BY MEANS OF CATION EXCHANGE MATERIALS

Herbert R. Appell, Chicago, Ill., assignor to Universal Oil Products Company, Chicago, Ill., a corporation of Delaware No Drawing. Application July 31, 1952,
Serial No. 301,963

11 Claims. (Cl. 23—152)

This invention relates to a process for removing metallic impurities and in some instances non-metallic impurities, which can be converted into a cation form, from precious metals. The process of my invention, while particularly adaptable to the purification of solutions containing platinum compounds, may also be used for the purification of other precious metals including iridium, osmium, palladium, rhodium, ruthenium, silver, gold, etc. These metals have the property of forming anions of complex acids, that is, anions containing Cl, CN, or the like.

In many industrial applications it is desirable to remove impurities from precious metals and this is especially true in the catalytic field since these previous metals are used as catalysts and are often present in the catalyst in exceedingly low percentages. In a recently developed catalyst that is used in the reforming of gasoline, the percentage of platinum on an alumina base carrier may vary from about 0.01% to about 1% by weight of the final catalyst. Due to these exceedingly low percentages of precious metal, it is important that the precious metal be free from or contain only very small percentages of impurities, since the presence of these impurities is often objectionable and may mask or counteract the effect of the precious metal in the desired catalytic reaction. Heretofore chemical, as well as electrolytic processes, have been suggested to purify these precious metals or precious metal compounds. In one electrolytic process the aqueous solution is subjected to electrolysis and the metal is plated out and recovered. The disadvantage of this type of process is that it is slow and it is likewise very difficult to remove all of the impurities. Since the precious metal is often desired in such a highly purified form especially in catalyst manufacture, the electrolytic process is not particularly adaptable to the purification of these metals.

It is an object of my invention to purify precious metals in aqueous solutions in which they are present in the form of anions more quickly and more economically than has been possible heretofore. Another object of my invention is to provide a process for the removal of impurities from precious metals and to substantially completely remove these impurities.

I have discovered that when an aqueous solution of an impure precious metal, in which the metal is in the form of an anion, is contacted with a solid cation exchange material, the impurity is removed by cation exchange and the resultant solution contains the precious metal in a highly purified state.

I have further discovered that when an impure precious metal is reacted to obtain the precious metal in the form of an aqueous solution of a complex acid and the solution is contacted with a solid cation exchange material the impurity is removed by cation exchange and the resultant solution contains the precious metal in a highly purified state.

In a broad embodiment the present invention relates to a process for removing a metallic impurity or non-metallic impurities which can be converted into a cation form from a precious metal, which comprises dissolving said impure precious metal in an aqueous acid solution to form a complex anion of the precious metal and the acid and a cation of the impurity, contacting the resultant solution with a solid cation exchange material whereby said impurity in the form of a cation is taken up by said cation exchange material, and separately recovering a solution of the precious metal substantially free from said cation impurity.

In another embodiment the present invention relates to a process for removing a cation impurity from an aqueous solution containing the precious metal in the form of an anion which comprises contacting said solution with a solid cation exchange material whereby said impurity in the form of a cation is taken up by said cation exchange material, and separately recovering a solution of the precious metal substantially free from said cation impurity.

In still another embodiment the present invention relates to a process for removing a cation impurity from an aqueous solution containing the precious metal in the form of an anion which comprises contacting said solution with a solid cation exchange material, capable of being regenerated with an aqueous acid solution, and at a temperature below the decomposition temperature of said cation exchange material, whereby said impurity in the form of a cation is taken up by said cation exchange material, separately recovering a solution of the precious metal substantially free from said cation impurity.

Platinum, iridium, osmium, palladium, rhodium, ruthenium, silver, gold, etc. often contain impurities such as copper, nickel, iron, manganese, magnesium, sodium, potassium, etc. While the presence of these impurities is not ordinarily objectionable in most of the commercial uses of these precious metals, their presence may be objectionable in other uses especially in catalyst manufacture. I have discovered and my invention broadly comprises a process for the removal of these impurities by converting the precious metals to anions while the impurities are converted or remain as cations and are removed in a cation exchanger.

One common and particularly adaptable complex of the precious metals is the chlorine complex. As an example, platinum acid may be present as chloroplatinic acid having the formula $H_2PtCl_6$ and similarly the acid complex of palladium is $H_2PdCl_6$ and the acid complex of gold is $HAuCl_4$. As an example, an aqueous acid solution of these metals in which the precious metal is present in a complex form as an anion may be formed by dissolving the metal along with its impurities in aqua regia, evaporating down to dryness, dissolving the resultant salt in water and evaporating down to dryness again and dissolving this final resultant salt in water. The evaporation to dryness while not necessary is preferred since the cation exchange materials that are to be used in the process of my invention, and which will be hereinafter described in detail, operate more efficiently if the pH of the acid solution of the precious metal is not too low and preferably the pH should be above about 1. Thus, while forming the complex anion of the precious metal that is to be purified, the impurities are converted to cations. While the chlorine complex has been mentioned because of its ease of preparation, it is to be understood that other complexes of the precious metals may be formed where the precious metal is present as an anion, however these other complexes will not necessarily give equivalent results. An example of another complex is the cyanide complex.

According to the process of my invention, the aqueous acid solution of the precious metal, which contains the precious metal in an anion form and the impurity in the cation form, is contacted with a solid cation exchange resin to remove the cation impurity and the precious metal passes through unconverted. The process is operative even though the impurities are present in a greater concentration than the precious metal and the impurities will be removed just as effectively when they are present in exceedingly low amounts. As an example, a chloroplatinic acid solution containing 1% of iron, when purified in accordance with the process of my invention, will be found to contain such a low percentage of iron that it is impossible to detect its presence by ordinary analytical means.

Thus, while it is possible to remove all traces of impurities from the aqueous acid complex solution of the precious metal, due care must be exercised to be certain that a sufficient length of time is provided for contact between the solution and the cation exchange resin in order that all of the cation impurities are removed and it is also necessary, especially in later stages of ion exchange, to be sure that the cation exchange resin still has the ability to further remove the cation impurities. There is a definite amount of the cation impurity that a cation exchange resin may react with and when this point is reached the resin will no longer exchange with the cation impurity and it will be necessary to regenerate the cation exchange resin.

Almost any solid cation exchange material that can be converted to an acid form may be used in the process of my invention. However, strongly acidic organic exchangers are preferred because they can be used in strongly acidic solutions with little loss of efficiency. Examples of organic cation exchangers that may be used in my process are the sulfonated coal or carbonaceous zeolites, synthetic resins of the phenolic or non-phenolic type. A specific example of a cation exchange resin of the non-phenolic type is a sulfonated copolymer of styrene and divinylbenzene. These exchange materials may be present in various physical forms such as powders or chips and a particularly suitable form is the spheroidal form. These ion exchange materials have different relative capacities for removing the different anion impurities from the aqueous acid solutions and by experimentation it is possible to determine the most effective ion exchange material to be used to remove the specific impurities present, for example, it has been found that a sulfonated cation exchange resin, commercially known as IR–120 Amberlite, will very effectively remove the cation impurities of iron and copper. Since the complex is present in an acidic aqueous solution, it is desirable that the cation exchange material be stable with reference to this acidity and for this reason the sulfonated resins are particularly suitable.

Generally speaking, the cation exchange materials that are preferred can be regenerated by treatment with an acid solution and, in the resulting hydrogen condition, they will remove all of the metallic cation impurities from the solution. The cation exchange materials have satisfactory physical stability especially in reference to temperature so that they may be used at temperatures from the freezing point of the solution to be purified up to the boiling point of the solution to be purified, however, each ion exchange material is specific in reference to the maximum temperature at which it is stable. As an example, the maximum temperature at which a mono-functional sulfonated copolymer of styrene and divinylbenzene will operate satisfactorily is approximately 300° F.

During the initial stages of cation exchange the cation exchange resin will physically hold some of the precious metal by some manner of an adsorption or absorption mechanism. The amount physically held by this means is very small and reaches a constant value. After the cation exchange resin is used for removing impurities it is often desired to recover the small amount of precious metal retained by the resin. In another embodiment of my invention the cation exchange resin, containing a small amount of precious metal, is washed with water to remove the physically held precious metal. The water wash solution containing the precious metal is then passed through an anion exchanger which picks up the precious metal. The anion exchange material, containing the precious metal, may then be burned in the presence of oxygen which will convert the resin into gaseous products and will leave a residue of the precious metal. This residue of the precious metal may then be purified in accordance with the steps of this invention. When this method of recovery is used it is necessary that the anion exchange material be combustible and it is preferable that it have a low ash content to simplify the purification process.

The following examples are given to illustrate the novelty and utility of the process of my invention but not with the purpose of unduly limiting the generally broad scope of the invention.

*Example I*

2.5 grams of platinum containing approximately 1% by weight of iron and 1% by weight of copper was dissolved in aqua regia. The solution was evaporated to dryness and the resulting salt was dissolved in distilled water to obtain approximately 30 ml. of solution. The solution was again evaporated to dryness and the salt again dissolved in distilled water to approximately 30 ml. The resulting chloroplatinic acid solution containing the copper and iron impurities was then passed through a 5 ml. bed of commercial IR–120 Amberlite cation exchange resin which is a type of mono-functional sulfonated copolymer of styrene and divinylbenzene. The solution and cation exchange resin were maintained at room temperature, and the 30 ml. of solution was passed through in approximately 30 minutes. An examination of the effluent stream showed that the chloroplatinic acid solution was free of iron and copper impurities.

*Example II*

Gold containing iron and nickel impurities may be dissolved in aqua regia. The solution is evaporated to dryness and redissolved in distilled water and the resulting solution is passed over a cation exchange material of the phenolic type. The resultant effluent will be free of the iron and nickel impurities.

*Example III*

2.5 grams of platinum containing 1% by weight of iron and 1% by weight of copper was dissolved in aqua regia. The solution was evaporated to dryness and the resulting salt was dissolved in distilled water to obtain approximately 30 ml. of solution. The resulting complex acid solution of chloroplatinic acid containing the copper and iron impurities was then passed through a 5 ml. bed of a phenolic type cation exchange resin. An examination of the effluent stream showed that the chloroplatinic acid solution was free of iron and copper impurities. The cation exchange resin may be washed with a small amount of distilled water to remove traces of the platinum compound from the resin. The resultant water wash solution is contacted with an anion exchange resin of low ash content. The anion exchange material will pick up the traces of platinum compound from the water wash solution. The anion exchange material may then be burned in contact with air and the resultant ash containing platinum may be further purified by dissolving in aqua regia and purifying the resultant solution in accordance with the steps of this invention.

I claim as my invention:

1. A process for removing a cation impurity from an aqueous solution of an acid containing a chlorine complex of a precious metal as an anion, which comprises contacting said solution with a solid cation exchange material at a temperature below the decomposition temperature of said cation exchange material whereby said impurity in the form of a cation is taken up by said cation exchange material, and separately recovering a solution of the precious metal substantially free from said cation impurity.

2. A process for removing a cation impurity from an aqueous solution containing a precious metal as part of an anion of a complex acid which comprises contacting said solution with a cation exchange material capable of being regenerated with an aqueous acid solution and at a temperature below the decomposition temperature of said cation exchange material whereby said impurity in the form of a cation is taken up by said cation exchange material and separately recovering a solution of the precious metal substantially free from said cation impurity.

3. The process of claim 2 further characterized in that said precious metal as part of an anion of a complex acid is platinum in the form of chloroplatinic acid.

4. A process for removing a cation impurity from an aqueous solution containing a precious metal as part of an anion which comprises contacting said solution with a solid cation exchange material, capable of being regenerated with an aqueous acid solution, at a temperature below the decomposition temperature of said cation exchange material, whereby said impurity in the form of a cation is taken up by said cation exchange material, separately recovering a solution of the precious metal substantially free from said cation impurity, washing said cation exchange material with water to remove an anion containing the precious metal, contacting the resultant aqueous solution with a solid anion exchange material whereby said anion is taken up by said anion exchange material, removing aqueous solution from contact with said anion exchange material, burning said anion exchange material in contact with air to form gaseous products from said anion exchange material, redissolving the resultant ash in an aqueous acid solution to form the anion complex of said precious metal, and purifying the resultant complex acid solution by contacting it with a cation exchange material.

5. A process for removing a metallic impurity which can be converted into a cation form from a precious metal, which comprises dissolving said impure precious metal in an aqueous acid solution to form an anion of the complex acid of the precious metal and a cation of the impurity, contacting the resultant solution with a cation exchange material whereby said impurity in the form of a cation is taken up by said cation exchange material, and separately recovering a complex acid solution of the precious metal substantially free from said cation impurity.

6. A process for removing a cation impurity from an aqueous solution of chloroplatinic acid which comprises contacting said solution with a cation exchange material, whereby said impurity in the form of a cation is taken up by said cation exchange material, and separately recovering a chloroplatinic acid solution substantially free from said cation impurity.

7. A process for removing a cation impurity contained in an aqueous solution of an acid having as an anion a chlorine complex of a precious metal, which comprises contacting said solution at a pH value above about 1 with a solid cation exchange material for a sufficient time to absorb substantially all of said cation impurity in the solid material, and withdrawing the thus purified acid solution from said solid material.

8. The process of claim 7 further characterized in that said precious metal is platinum.

9. The process of claim 7 further characterized in that said solid material comprises a sulfonated cation exchange resin.

10. The process of claim 7 further characterized in that said precious metal is selected from the group consisting of platinum, iridium, osmium, palladium, rhodium, ruthenium, silver and gold and said cation impurity is selected from the group consisting of copper, nickel, iron, manganese, magnesium, sodium and potassium.

11. A process for purifying a chloroplatinic acid solution containing at least one cation impurity selected from the group consisting of iron and copper, which comprises contacting said solution at a pH value above about 1 with a solid cation exchange material for a sufficient time to absorb substantially all of said cation impurity in the solid material, and withdrawing the thus purified acid solution from said solid material.

References Cited in the file of this patent

UNITED STATES PATENTS

| | | |
|---|---|---|
| 2,162,936 | Burrell | June 20, 1939 |
| 2,546,938 | Bauman et al. | Mar. 27, 1951 |
| 2,606,098 | Bauman | Aug. 5, 1952 |

OTHER REFERENCES

"Ind. and Eng. Chem.," July 1945, vol. 37, No. 7, pages 622–624.

"Ion Exchange Resins," by Robert Kunin and Robert H. Myers, 1950 ed., pages 25, 33, 35, 128, 135, 136. John Wiley and Sons, Inc., N. Y.

"A Course in General Chemistry," by McPherson and Henderson, third ed., page 680. Ginn and Co., N. Y.